United States Patent [19]

Farmont

[11] Patent Number: 4,618,182
[45] Date of Patent: Oct. 21, 1986

[54] SUN ROOF FOR A VEHICLE

[75] Inventor: Rolf Farmont, Düsseldorf, Fed. Rep. of Germany

[73] Assignee: Farmont Produktion GmbH & Co. KG, Düsseldorf, Fed. Rep. of Germany

[21] Appl. No.: 699,651

[22] Filed: Feb. 8, 1985

[30] Foreign Application Priority Data

Feb. 10, 1984 [DE] Fed. Rep. of Germany ....... 3404693
Jul. 7, 1984 [DE] Fed. Rep. of Germany ....... 3425103

[51] Int. Cl.$^4$ ............................................... B60J 7/08
[52] U.S. Cl. ..................................... 296/223; 49/386
[58] Field of Search ............... 296/223, 224, 216, 218; 49/386, 379; 98/2.14

[56] References Cited

U.S. PATENT DOCUMENTS

| | | | |
|---|---|---|---|
| 3,367,066 | 2/1968 | Slusser, Jr. ........................ | 49/386 |
| 3,911,802 | 10/1975 | Morden ............................. | 296/223 |
| 4,300,440 | 11/1981 | Hoter ................................. | 49/386 |
| 4,428,614 | 1/1984 | Vogel et al. ...................... | 296/224 |

Primary Examiner—Robert R. Song
Attorney, Agent, or Firm—Yount & Tarolli

[57] ABSTRACT

A sun roof for a vehicle has an opening therein closed by a cover plate. The cover plate is pivotally attached to the roof at the front edge thereof. The rear edge of the cover is adapted to move vertically relative to the plane of the roof. An adjusting device is provided for moving the rear edge of the cover plate. The adjusting device includes a spring for applying a spring force to the rear edge of the cover plate to move the rear edge thereof vertically. The adjusting device further includes flexible pulling means acting against the spring force and connected to the cover plate at one end thereof and driving means for driving the other end of the flexible pulling means to provide for opening or closing of the roof opening.

23 Claims, 17 Drawing Figures

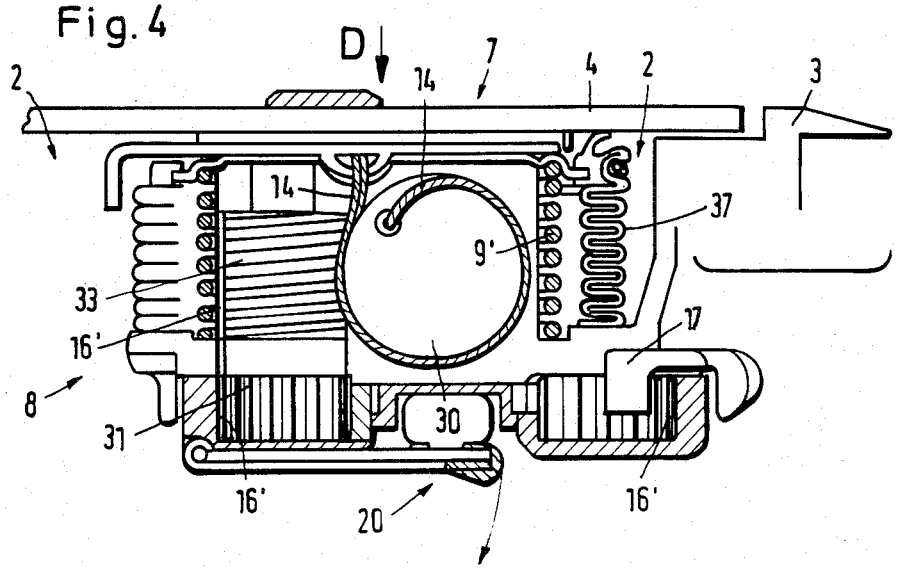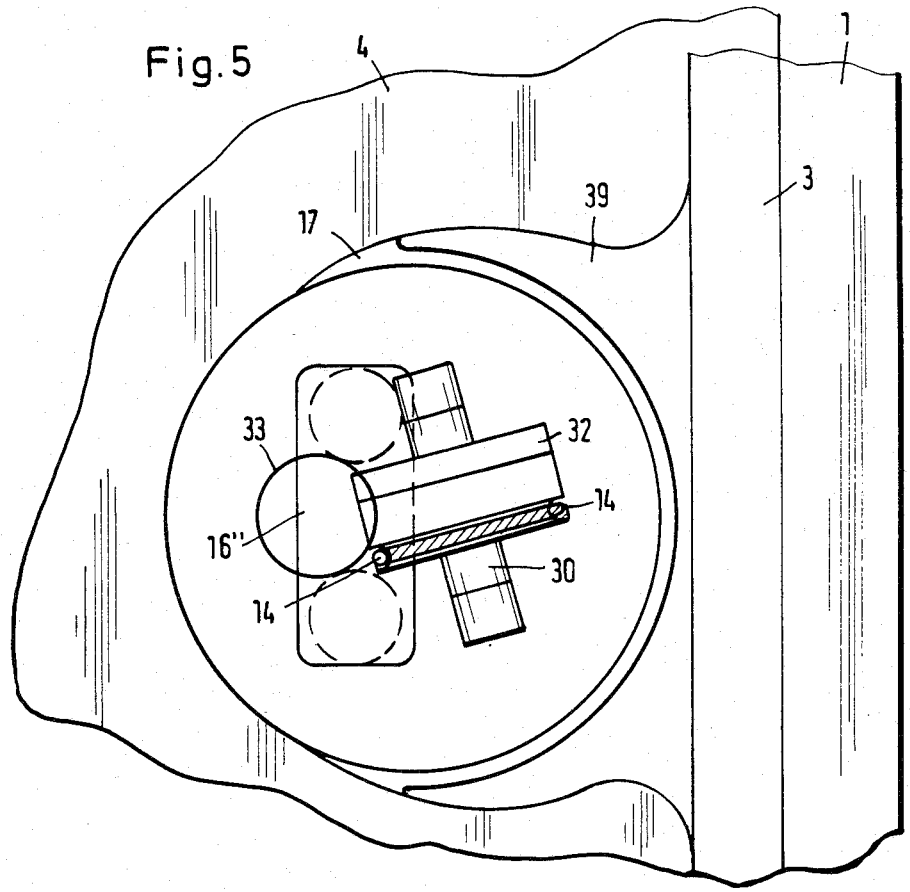

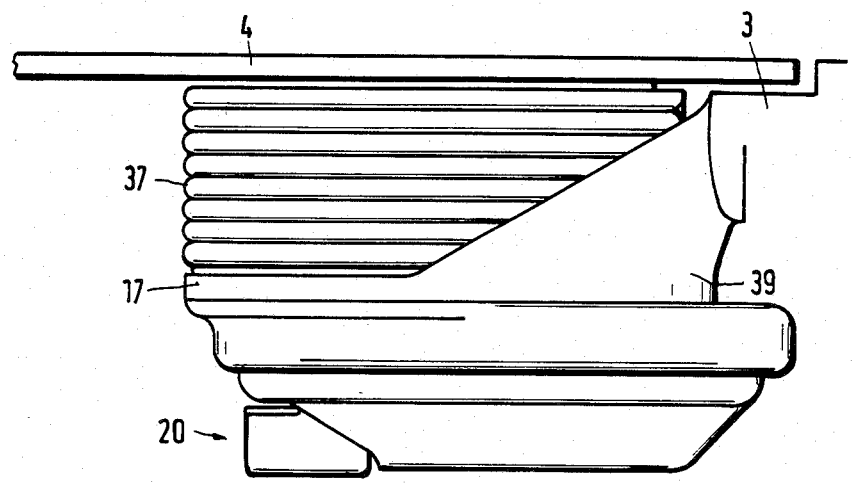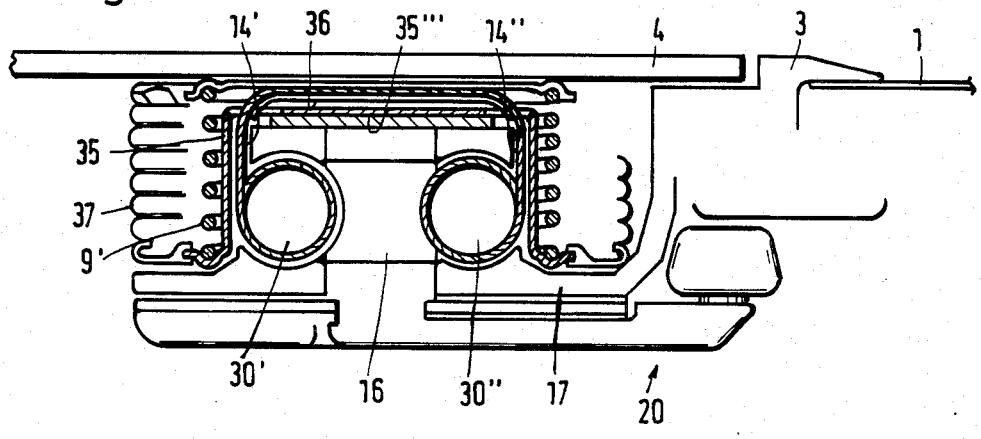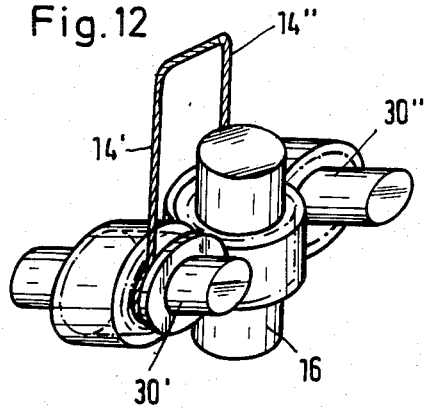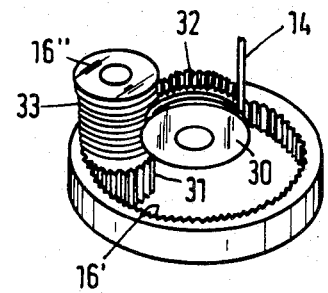

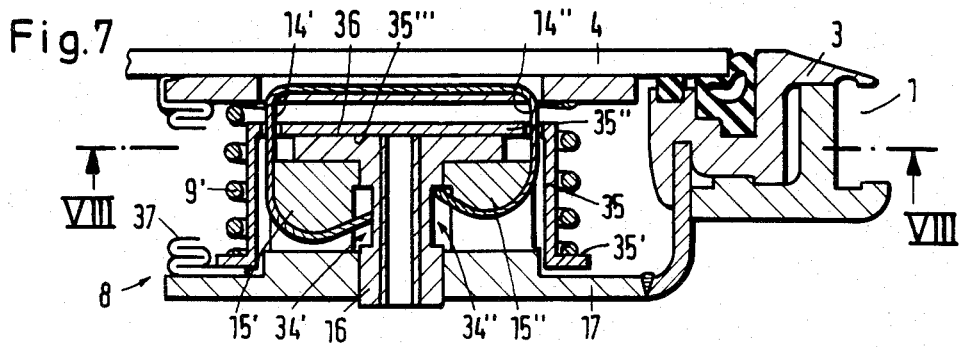
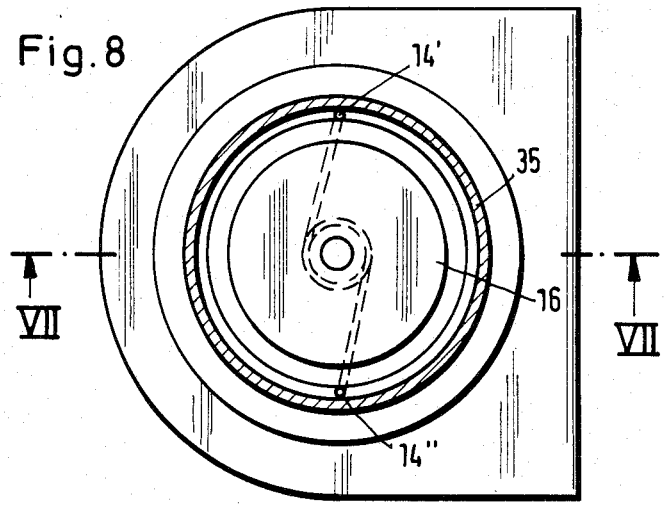
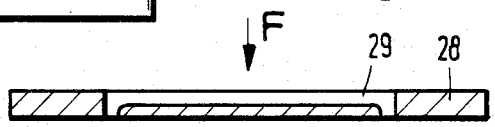
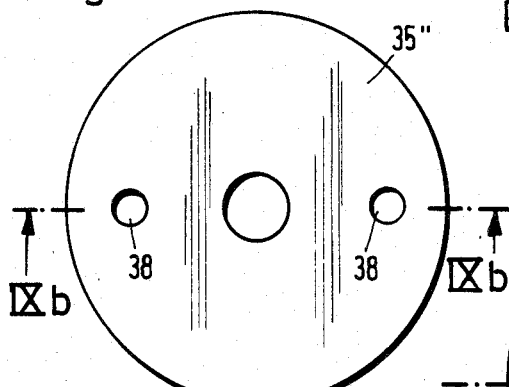
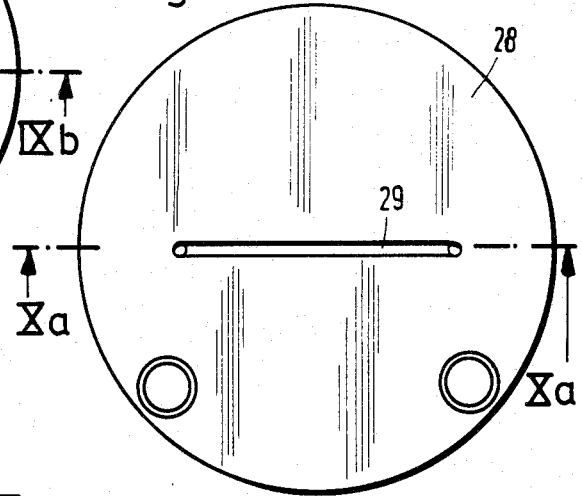
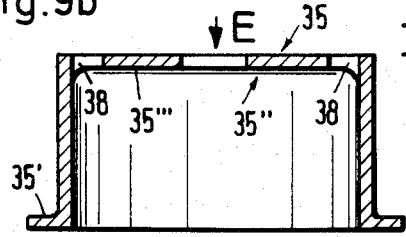

SUN ROOF FOR A VEHICLE

The invention relates to a sun roof for vehicles in which the roof opening is closed by a cover plate. The front end of the plate is adapted to pivot about an axle extending transverse to the lengthwise direction of the vehicle, and the rear end of the plate is height-adjustable with respect to the plane of the roof. A height-adjusting device effects adjustment of the rear end of the plate.

Such vehicle roofs are disclosed in German laid-open application Nos. 2,645,288 and 2,736,459. In this known prior art, the height-adjusting device comprises a telescopic spindle drive, and side hinge points of the cover plate move lengthwise of the vehicle. Such adjusting devices are expensive to manufacture, since a plurality of moving parts must be made with exact dimensions of conjugated surfaces, since any axial play can lead to vibrations and knocking noises when the cover plate is raised. A particular disadvantage of the prior art devices is little room for accommodating the drive and for adjusting the movable distance. Especially with manual actuation of the spindle drive wheel, a large number of turns is necessary for a sufficiently large movement of the cover plate so that the roof opens widely enough. This is inconvenient, since, above all, the driver of the vehicle must take his hand off the steering wheel for a relatively long time.

The object of the present invention is to provide a height-adjusting device of the kind mentioned having a freely selectable drive ratio between the angle of the front end of the roof pivoting and the driving distance, especially for a manual drive, and in which, despite simple construction and with little parts, a relatively wide opening of the cover plate is possible and, nevertheless, an arrangement free of play and without knocking, is obtained. In particular, a pulling cable (rope) drive, simple to handle and to manufacture is provided. Furthermore, an effective locking device is provided for fixing the cover plate in different pivotal positions, and the adjusting device takes the least possible space and is properly protected against influence of environment. The pulling drive is able to transmit sufficiently high forces.

According to the invention, the adjustment of the height of the rear end of the cover plate is effected by applying a spring force thereto from a compression spring to pivot the cover plate. The spring force acts against the action of a pulling drive held constantly under tension and actuated in the opening and closing direction. This pulling cable or like means may, in principle, be operated by a hand or by a motor. A drive shaft is drivingly connected with the pulling cable by special means, for example, by means of teeth, or through friction force means, so that the pulling element after a turn by at least 90 degrees disengages from the drive shaft or is wound up on a winding shaft. With a turning of about 60 degrees, the pulling angle in relation to the roof plane would be too flat, or the free end of the pulling cable would come into the vehicle space. In each case, locking device of a friction type or with spiral locking means prevents a spontaneous opening of the cover plate under the action of the spring.

Such an adjusting device has, among others, the advantage that it consists of only a few individual parts, and the hinge point of the cover plate and points of application of the spring action and the pulling element are stationary and cannot be pushed along. The ratio between the pivoting and driving distances is variable as desired, in principle. In particular, it is possible, with a relatively small drive distance, for example, with only a very little turning of a hand lever to open the cover plate quite widely. One special advantage is the small design height, of the adjusting device so that the adjusting device can fit below the cover plate, since the spring drive as compared with a telescoping spindle drive, in a closed position, can be extremely flat.

According to preferred embodiments of the invention, a spiral spring is used with its maximum length in an unstretched condition. The coils of the spring are preferably concentric, one within the other so that, with full compression of the spring, all coils lie one within the other, and the spring takes no more space than the thickness of the spiral material. When the spring wires have a circular cross section, however, a cylindrical spiral spring may also be used. In any case, the pulling element is preferably arranged inside the spiral spring and extend parallel to the axial direction of the spring.

It is possible, in principle, to use several springs and only one pulling strip and drive shaft, so that a four-point support of the cover plate is possible. An especially pleasing appearance is obtained when, according to a further development of the invention, the spring is arranged above and a drive lever of the drive shaft below a bearing plate projecting into the roof opening from the vehicle roof. In this way, the bearing plate with the lever mechanism, as seen from below, completely covers the spring.

An ergonomically favorable handling of the drive lever of the drive shaft and, at the same time, a good arrangement of the pulling element and the spring is obtained when, according to another embodiment of the invention, the pulling element on the vehicle roof is turned around a roller by about 90 degrees and directly after this can be moved forward and backward by its free end by a drive shaft having an axis almost perpendicular to the plane of the vehicle roof. In this case, the pulling element is moved, especially wound up, in a plane extending parallel to the vehicle roof, while the drive shaft is almost perpendicular to the vehicle roof. Especially suitable in this case, are flexible metal wires, especially steel wires, or plastic cords as a pulling element since they, despite great holding force, can be very thin and flexible and, therefore, suitable for winding up. In principle, however, flexible plastic toothed rods, or link chains, or similar pulling elements which can be wound up, are suitable since, in principle, they are subjected only to pulling forces and never to compression forces.

With use of a hand lever drive with a lever arm extending parallel to the vehicle roof, it is recommended that the latter is able to bend over by 180 degrees about an axis extending parallel to the vehicle roof at a right angle to the lever arm, so that when the lever is not in use, it can be kept relatively small and kept in a protected housing, but, at the same time, in the operative condition, the lever arm is sufficiently long.

According to another feature of the invention, it is especially advantageous, with the use of a drive shaft with a lever drive, to provide the lever arm with a locking arm opposite from the lever handle and which extends beyond the drive shaft and has teeth thereon engaging teeth on a bearing plate for detachably locking the locking arm and thereby the drive shaft. With this solution, preferably, the lever arm and the locking arm form a two-way tilting lever. The lever arm of which pivots against a force toward the vehicle roof while the locking arm pivots away from the vehicle roof, so that the teeth engaged in a rest position disengaged. It is sufficient, as a rule, that the weight of the lever arm is such that it has a greater moment of rotation than the locking arm; but, for safety, a spring may also be provided acting between the lever arm and the bearing plate to keep the teeth on the bearing plate and the locking arm engaged in the rest position. In such an adjusting device, it is sufficient to pivot the lever arm only slightly against the vehicle roof to disengage teeth, and the lever arm can be turned to a desired opening position in which the teeth on the locking arm again engage the teeth on the bearing plate.

If, according to another feature of the invention, the pulling element can be wound up on a winding shaft extending almost perpendicular to the pulling direction, and the winding shaft is driven by engaging teeth on the drive shaft, a thinner wire or the like may be used as the pulling element. In one of the embodiment of the invention, the drive shaft comprises an inner toothed crown engaging outer teeth on a shaft having a worm threading at the end thereof engaging an outer toothed crown of a winding shaft. In this way, a drive ratio is obtained which permits, with little angular movement of the outer toothed crown, complete opening or closing of the sun roof, while the worm drive insured a complete locking against automatic (spontaneous) opening of the cover plate.

The use of a sufficiently thin and elastic pulling element which can be wound up in a small space and, at the same time assures a sufficient pulling force is obtained, according to another feature of the invention by providing two substantially equal pulling portions having a connection portion running almost parallel to the cover plate. The connection portion is located adjacent the cover plate, and a mounting plate that can be joined to the cover plate is provided which plate includes a guide track for the connection portion of the pulling portions. Preferably, this mounting plate has an opening for a bayonet lock for attaching the mounting plate to the cover plate.

The drive ends of the pulling portions may either be wound up separately on two winding shafts, in which case the two winding shafts may have a common axis or two axes extending almost parallel, or may be turned by about 90 degrees and wound up on a single drive shaft. In the latter case, two axially spaced winding zones on the drive shaft assure a clean and separate winding of the two pulling portions in the least space.

An effective locking device, according to another feature of the invention, comprises an approximately U-shaped cup-like locking element having a bent out rim formed by free portion of the cup end which rim supports the spring. An end surface on the drive shaft engages the inner surface of the bottom of the cup-like locking element forming with it corresponding locking surfaces. With this arrangement, the farther the cover plate is closed, the greater is the pressure applied to the locking surfaces. In other words, the greatest locking effect is obtained when the spring force acting on the cover plate in the adjusting direction is greatest. By suitable dimensional shaping of the locking surfaces, the locking effect attainable can be adapted to a necessary amount predetermined by the spring.

To protect the spring and any other components of the adjusting device, the spring, according to another embodimnt of the invention is surrounded by a bellows and, thus, is protected against any influence of environment. A pleasing appearance of the adjusting device is also obtained in this way.

Worm gears usually preferred for the adjusting device of the invention are generally not self-locking. However, it has been found, surprisingly, that a very effective self-locking is obtained in the adjusting device of the invention when according to another feature of the invention, the drive shaft bears a worm threading over a part of its length which engages a worm wheel (outer toothed crown) of the winding shaft when the gear ratio is between 3:1 and 10:1, preferably about 7:1. In this way, the drive shaft, even without special mechanical locking, remains in its particular rotational position even when it is no longer driven, in particular, when the hand lever has been released. Depending on road conditions and the kind of vehicle, it may be advantageous to provide an additional mechanical locking if action of strong shaking and vibration on the vehicle roof is to be feared. The worm threading is preferably triple-threaded, that is, three worm leads are evenly distributed on the circumference of the drive shaft.

A mechanical locking device, additionally or alternatively used for the adjusting device of the invention is characterized in that the lever arm of the lever of the drive shaft is movable lengthwise and a lock element is so arranged between the lever and the vehicle roof that by the lengthwise movement of the lever, the element can be locked and unlocked, respectively, in different turning positions of the lever. The actuation of the lock element takes place, preferably by a slight pull outward on the lever arm, for example, against the action of a spring. A lock means, provided on the lever arm disengages by such a pull from the corresponding counterlock element on the vehicle roof or the housing of the adjusting device. When the adjusting device is unlocked, the lever arm can be operated while a slight pull outward is maintained. Upon releasing the lever arm, the latter is pushed back, for example, by a prestressed spring into the rest position while the corresponding lock means are again engaged. For fixing the lever in various swinging positions of the cover plate, locking means are provided, for example, circularly around the axis of the lever.

The above-mentioned elements to be used according to the invention may be of various size, shape, choice of material and technical design, to no special exceptional conditions, so that the criteria of choice in the particular zone of application can be used without limit.

Other details, features and advantages of the subject invention will be apparent from the following description with reference to respective drawings in which preferred embodiments of the sun roof according to the invention and, particularly, the adjusting device according to the invention are shown. In the drawings:

FIG. 4 shows a vertical section of another embodiment of the sun roof;

FIG. 5 shows a top view of the same sun roof (view D in FIG. 4);

FIG. 6 shows a perspective view of the drive mechanism of the adjusting device of FIG. 4;

FIG. 7 shows a cross section of another embodiment of the sun roof along line VII—VII in FIG. 8;

FIG. 8 shows a cross section of the same sun roof along line VIII—VIII in FIG. 7;

FIG. 9a shows a top view of the locking element of the adjusting device of FIG. 7 (view E in FIG. 9b);

FIG. 9b shows a cross section of the same locking element along lines IXb—IXb in FIG. 9a;

FIG. 10a shows a vertical section of a mounting plate of the adjusting device of FIG. 7 along lines Xa—Xa in FIG. 10b;

FIG. 10b shows a top view of the same mounting plate (view F in FIG. 10a);

FIG. 11 shows a vertical section of another embodiment of the sun roof;

FIG. 12 shows, in principle, a drive system of the adjusting device according to FIG. 11;

FIG. 13 shows a side view of an adjusting device similar to that of FIG. 11;

Figure 1:
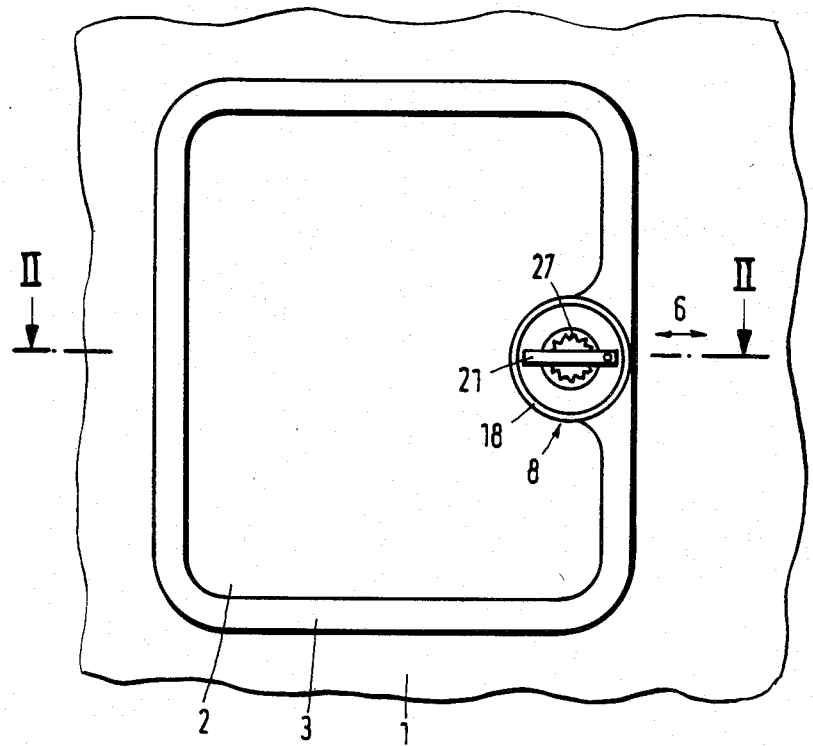
FIG. 1 shows a sun roof seen from below (view A according to FIG. 2)
Figure 2:
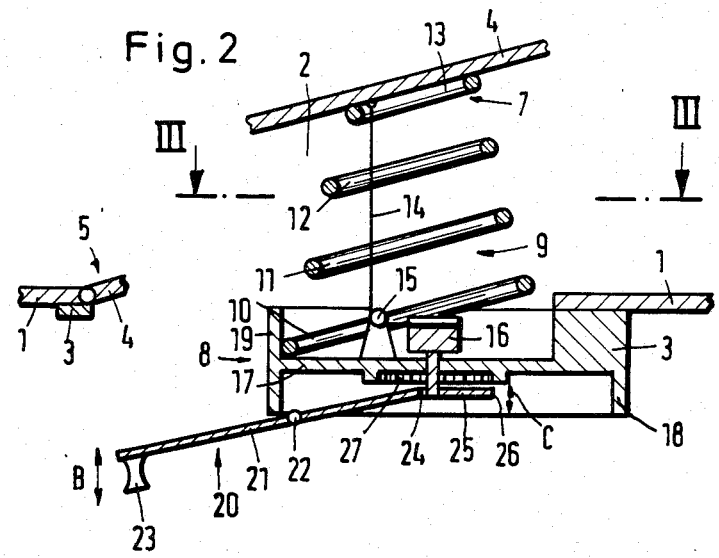
FIG. 2 shows a cross section of the same sun roof along the line II—II in FIG. 1 on an enlarged scale with the lever in the rest position.
Figure 3:
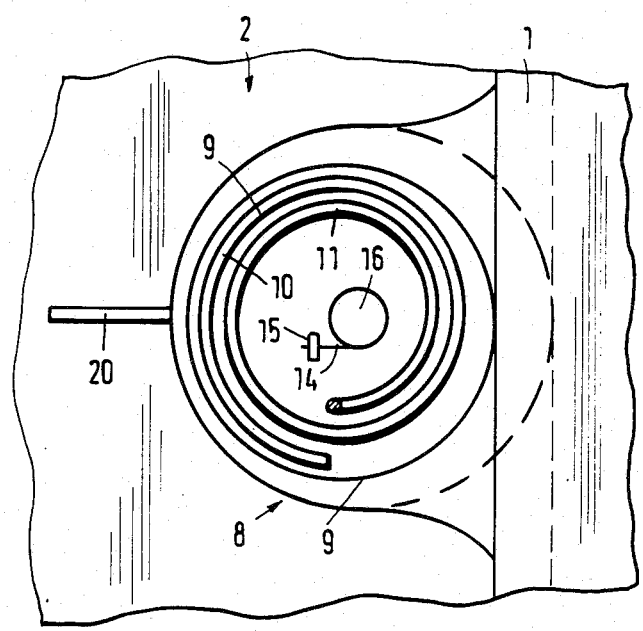
FIG. 3 shows a cross section of the same vehicle roof along line III—III in FIG. 2.

According to FIG. 1, a vehicle roof 1 comprises a frame 3 defining a roof opening 2, and a cover plate 4 (FIG. 2) for closing the opening. At its front edge 5, the cover plate 4 has an axle attached thereto and extending transverse to the lengthwise direction 6 of the vehicle. The axle is provided for attachment of the cover plate 4 to the roof and for pivotal movement of the plate. An adjusting device 8 is arranged in the zone 7 of the rear end of the cover plate between the plate and vehicle roof. The device 8 comprises a spiral spring 9 having its maximum length in the unstressed condition and its coils 10–13 concentrically arranged. In the maximum opening position of the cover plate, the spring should already be slightly prestressed, however, to prevent knocking.

Flexible pulling drive means 14, such as a highly flexible steel cable or a nylon cord, is secured to the cover plate 4 in zone 13 of the plate at one end thereof. At its other end, the cable is secured to a drive shaft 16 being located in a groove therein. The cable forms an angle of about 90 degrees around a side roller 15 fixed to the vehicle roof. The cable 14 extends within the spiral spring such that when the cover fully closes the opening, the pulling cable 14 and the roller 15 are still arranged within the coils 10–13 which are concentric and are arranged one within the other. With this arrangement, the cross section of the coils of the spiral spring 9 may be rectangular, instead of circular. The drive shaft 16 extends almost perpendicular to the plane of the vehicle roof 1 and passes through a bearing plate 17 integral with the frame 3 or screwed or otherwise fastened to it. The bearing plate 17 projects into the roof opening 2 approximately as a circular segment. The bearing plate 17 is provided on both sides with rims 18, 19 between which are located the spiral spring 9, the pulling cable 14, the roller 15 and the winding drum of the drive shaft 16. The rim 18 is provided with a recess for receiving a lever 20, a lever arm 21 of which can pivot about a hinge 22 and, thus, can be considerably shortened for the rest position in which the lever handle 23 is located within the rim 18. The lever is connected to the drive shaft 16 without possibility of rotation thereabout. A hinge 24 extending transverse of the roof provides for pivotal movement of the lever in the direction of arrows B, C. The lever arm 21 includes a locking arm 25 lying opposite the lever handle and projecting beyond the drive shaft 16. The locking arm 25 includes teeth 26 that in the rest position of the lever engage with corresponding teeth 27 which are arranged in a circle on the bearing plate 17. The teeth 26 and 27 are kept in engagement with each other under the weight of the lever arm 21 when the arm is in a rest position.

Upon lifting of the lever arm 21, the teeth 26, 27 disengage, and the lever 20 can be rotated to further open or close the opening. In this way, there is provided effective means for fixing the pulling cable in different pivotal positions of the cover plate.

Another possibility not shown in the drawings, of operating the pulling element consists in securing the free end of the pulling cable to a slide which can be moved back and forth by a threaded spindle. Locking is obtained, in this case, naturally due to locking feature inherent in immovable threads.

FIG. 4 shows another embodiment of the adjusting device 8. A shaft 16" is supported on the bearing plate 17. The shaft 16" extends in the pulling direction of the element 14. At the end of the shaft extending downward through the bearing plate 17, there is an outer toothed crown 31 engaging an inner toothed crown 16' which can be driven by a lever 20, which can be snapped out (see FIG. 6). The end of the shaft 16" passing upward of the bearing plate 17 has a worm threading 33 thereon which engages, as shown in FIG. 6, an outer toothed crown (worm wheel) of a winding shaft 30, rotatable about an axis extending perpendicular to the pulling direction of the cable 14. The pulling cable 14 can be wound up on this winding shaft. The cylindrical spiral spring 9' supported on the bearing plate 17 is surrounded by a bellows 37.

In another embodiment of the adjusting device 8, according to FIGS. 7 to 10b, the pulling element consists of two portions 14', 14" which, by means of a fastening plate 28, can be screwed to the cover plate, can be secured to the cover plate. In this embodiment, a thin metal strip or the like is used, of which both free ends are wound on the vertical drive shaft 16, supported rotatable in the bearing plate 17. The two pulling portions 14' and 14" are joined together adjacent the cover plate. The connection zone of the two parts is guided by a guiding groove 29 in the fastening plate 28. The drive shaft 16, above the bearing plate 17, is surrounded by two axially spaced rotatable surfaces 15' and 15" that support the pulling portions 14', 14" and guide the free ends of the pulling element into axially spaced winding zones 34' and 34" on the drive shaft 16.

A cup-shaped locking element 35 is used as a locking device to prevent undesired opening of the cover plate 4 under the spring forces of the spiral spring 9'. The locking element comprises a bent outward rim 35' that serves as a lower support for the spiral spring 9'. This cup-shaped locking element extends within the cylindrical surface of the spiral spring 9'. The bottom 35' of the locking element having U-shaped form has opening 38' therein for the passage of the pulling portions 14', 14". Inner surfaces 35''' is designed as a disc-shaped braking surface. The surface 35''' corresponds to the widened bearing surface 36 of the drive shaft 16. Under the pressure of the spring 9, the more the cover plate 4 approaches its closed position, the more strongly the braking element 35 is pressed against the end surface 36. In this way, the drive shaft 16 is prevented from automatic (spontaneous) rotation in the direction of the cover plate opening movement.

The adjusting device, according to the embodiment shown in FIGS. 11 and 12, is also equipped with a similar designed locking element 35. Here also, the pulling element has two portions 14′, 14″, the common portion of which extends parallel to the cover plate 4. Unlike the embodiment of FIG. 7, the free ends of the pulling portions are wound up on winding shafts 30′, 30″ the axes of which extend perpendicular to the pulling direction. As a drive for the two winding shafts, is used either the drive shaft 16, extending approximately in the pulling direction, and which can be driven by a lever 20, with spiral teeth that engage respective teeth on the winding shafts 30′, 30″ for rotating the same, as known per se. Therefore, the particularities need not be shown in detail in the figures.

Bearing sleeves are used for supporting the winding shafts and the drive shaft, in the embodiments of FIGS. 7 and 11. The bearing shells can be screwed or glued together, of which the latter is preferably formed integral with the bearing plate 17.

As shown in FIG. 13, the bearing plate 17 may be connected to the frame 3 (see also FIG. 5) by rectangular shaped stiffening surfaces 39 that have good distribution of forces.

Most of the parts of the adjusting device can be made of plastic by an injection molding process.

Figure 14:
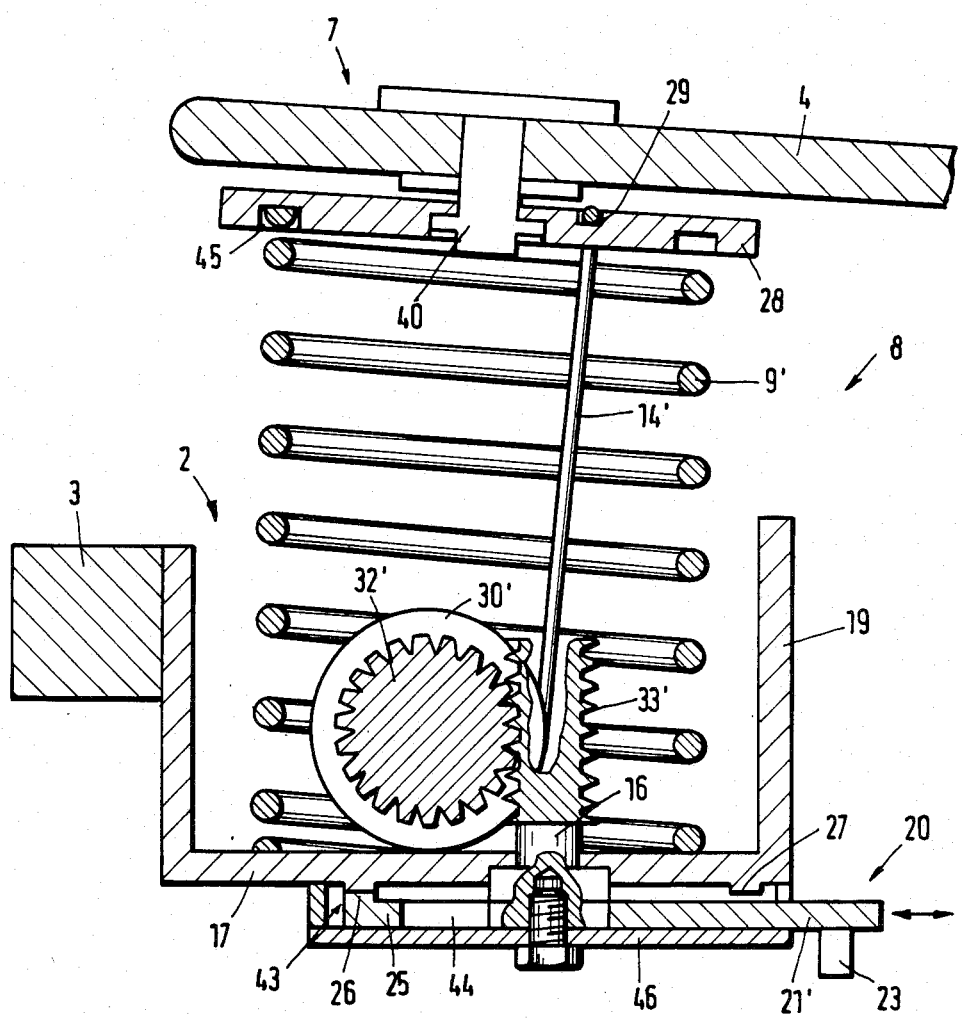
FIG. 14 is a vertical section of another sun roof with a fourth embodiment of the adjusting device.
Figure 15:
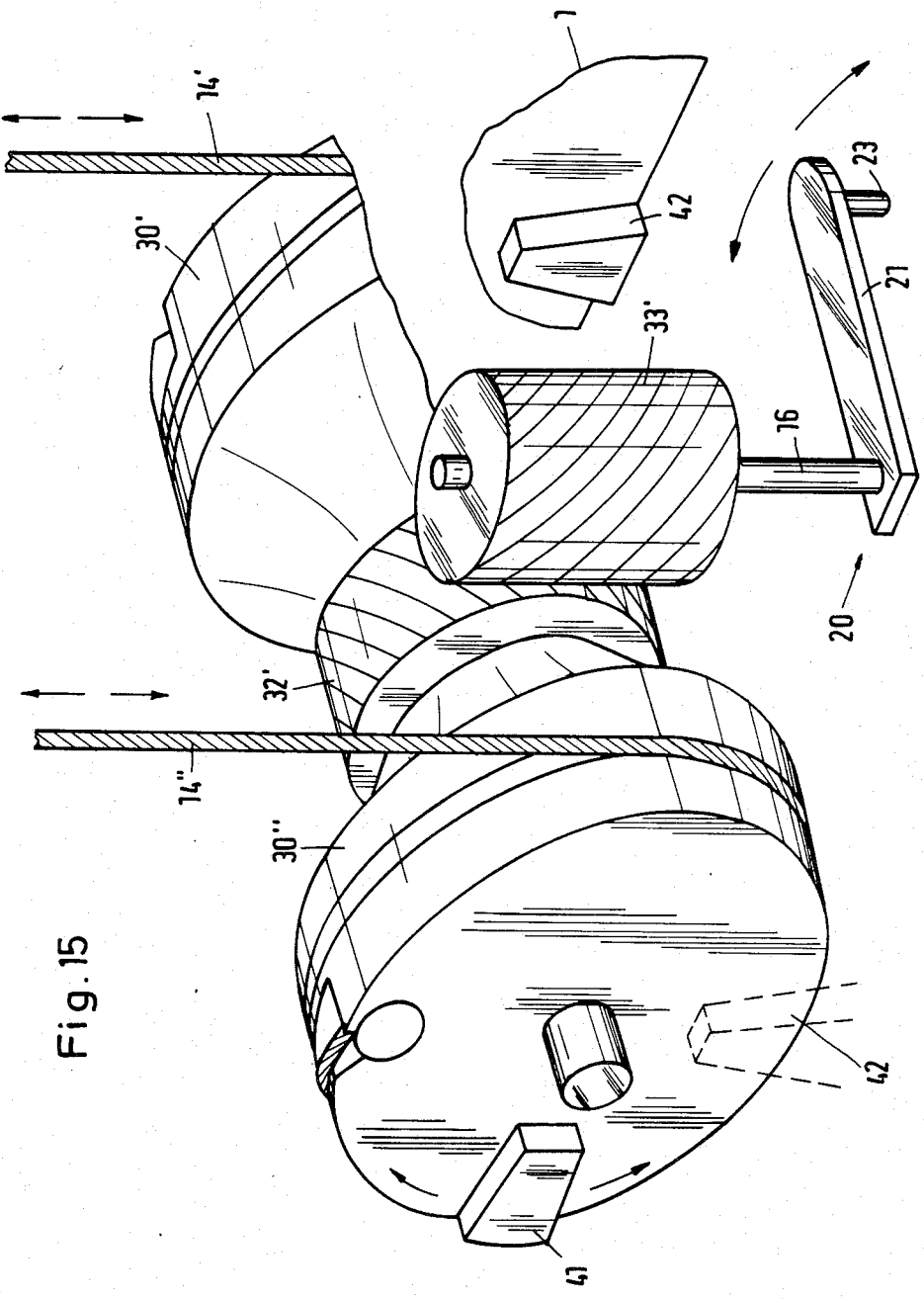
FIG. 15 shows a drive system for the adjusting device of FIG. 14.

The sun roof according to FIG. 14 is shown in a partly open pivoting position of the cover plate 4. The spring 9′ is supported in a circular groove 45 of a plate 28 on the cover plate inside surface. The plate 28 has a central opening 40 to receive a bayonet lock, by which it is connected to the cover plate 4 without pressure and pull. The pulling element consisting of two portions 14′ and 14″ is guided in the plate 28 off-center by two bores, not shown in the drawings, which are joined at the upper side by a turning groove 29 for the pulling element.

A triple thread worm gear 33′ forms the upper portion of the vertical drive shaft 16 and engages a worm wheel 32′ rotatable about a horizontal axis. The gear ratio of this worm gear is 7:1. On both sides of the worm wheel 32′, winding shafts 30′ and 30″ are arranged. The shafts are provided with spiral guide grooves for the pulling portions 14′ and 14″. The shafts have on their outer end sides stops 41, which cooperate with counter stops 42 on the vehicle roof 1 so that the two winding shafts can rotate by an angle of about 330 degrees. The diameter of their grooves is therefore so dimensioned that with a 330 degree rotation, the maximum opening position of the cover plate 4 is reached.

The pulling portions 14′ and 14″ made of steel cable are wound spirally, in the closing position, 1½ turns on the winding shafts 30′ and 30″. With cover plate fully open, the pulling portions are still wound about one-half of a turn; in this way, tearing at their points of attachment is prevented.

By a gear ration of 7:1, self-locking is obtained, so that the lever 20 of the drive shaft 16 can be released at any rotational position without the spring 9′ leading to a further opening of the cover plate 4. The additional locking element shown in FIG. 14 is, therefore, designed only as an additional safety device against undesired opening of the cover plate 4 in the case of strong shaking and vibrations. The lever arm 21′ is adapted to move lengthwise in a cover 46, and has an elongated hole 44, so that in any pushing position a locking connection with the drive shaft 16 is maintained. The stopping arm 25 on the opposite side of the drive shaft 16 from the lever arm 21′, is made integral with the arm 21′ and has teeth thereon which with corresponding teeth 27 on the bearing plate 17 form a lock device 43 which, in different rotational positions of the lever arm 21 secures the lever arm against rotation. For this purpose, the teeth 27 are uniformly distributed on a circumference below the bearing plate 17. Through a pull outward on the lever handle 23, the device 43 is released, and the lever can be operated. This can take place against the pull of a spring, not shown in the drawings, which, on release of the lever handle, forces the arm 21′ back into its locking position.

What is claimed is:

1. A sun roof for a vehicle comprising a cover plate for closing an opening in the roof, the cover plate having front and rear edges and being pivotally secured to the roof at the front edge thereof, the rear edge of the cover plate being adapted to move vertically with respect to the roof plane, and an adjusting device mounted on the vehicle roof for moving the rear edge of the cover plate, the adjusting device comprising spring means extending between the vehicle roof and the cover plate for applying a spring force to the cover plate to urge the rear edge thereof vertically upwardly, flexible pulling means acting against the spring force and having one end attached to the cover plate in the zone of the rear edge of the cover plate, drive shaft means operatively connected with the other end of the flexible pulling means for moving the other end of the flexible pulling means to provide for movement of the rear edge of the cover plate, and locking means for locking the other end of the flexible pulling means in a predetermined position to thereby retain the cover plate from movement beyond a predetermined position.

2. Sun roof according to claim 1 wherein the spring means is a spiral spring having the maximum length in its unstretched condition, coils of the spring being arranged concentrically one within the other.

3. Sun roof according to claim 2 wherein the flexible pulling means extend vertically within the spring means.

4. Sun roof according to one of claims 2 wherein the flexible pulling means comprises two substantially equal portions extending substantially parallel to each other.

5. Sun roof according to claim 4 wherein the two portions of the flexible pulling means are connected together at their ends adjacent the cover plate.

6. Sun roof according to claim 5 wherein a mounting plate for the flexible pulling means is connected to the cover plate, the plate having a guide groove for the connection portion of the flexible pulling means.

7. Sun roof according to claim 6 wherein the mounting plate has an opening for receiving a bayonet lock for connection to the cover plate.

8. Sun roof according to claims 5 wherein the free ends of the two portions of the flexible pulling means are wound up separately on two winding shafts.

9. Sun roof according to claims 5 wherein the free ends of the two portions are turned by 90 degrees and are wound up in common on a single drive shaft.

10. Sun roof according to claim 9 wherein the single drive shaft has two axially spaced winding zones for each free end of the two portions of the flexible pulling means.

11. Sun roof according to claim 1, 2, or 3 wherein the flexible pulling means is turned by about 90 degrees by means of a roller arranged on the vehicle roof, and the free end of the flexible pulling means is attached to the drive shaft means adjacent the roller, the axis of the drive shaft means extending perpendicular to the plate of the vehicle roof, and a lever is provided for rotating the drive shaft means.

12. Sun roof according to claim 1 wherein the drive shaft means comprises a threaded spindle received in a shoe to which the free end of the flexible pulling means is fastened for effecting reciprocal movement of the shoe.

13. Sun roof according to claim 1 wherein the flexible pulling means is wound up on a winding shaft extending almost perpendicular to the pulling direction, and the winding shaft is driven by a gear train from the drive shaft means that extends approximately in the pulling direction.

14. Sun roof according to claim 13 wherein a stop on the winding shaft and a corresponding stop on the vehicle roof are so arranged that the two stops when abutting each other limit opening of the cover plate.

15. Sun roof according to claim 14 wherein the drive shaft means comprises an inner toothed crown for driving another shaft having an outer toothed crown thereon engaged by said inner toothed crown, said another shaft having a worm portion engaging a worm on the winding shaft for driving the same.

16. Sun roof according to claim 15 wherein the drive shaft means has worm portion thereon which engages a worm wheel on the winding shaft for driving the same, the gear ratio of the worm drive being between 3:1 and 10:1.

17. Sun roof according to claim 16 wherein the worm is triple-threaded.

18. Sun roof according to claim 1 wherein a bearing plate of the drive shaft means extends into the opening in the vehicle roof and supports the spring, and on the opposite side of which, a lever for driving the drive shaft means is arranged.

19. Sun roof according to claim 18 wherein a lever arm of the lever for driving the drive shaft means can be pivoted by about 180 degrees around an axis extending parallel to the vehicle roof and perpendicular to the lever arm.

20. Sun roof according to claim 19 wherein the lever arm of the lever for driving the drive shaft means comprises a locking arm lying on opposite side from the lever handle and extends beyond the drive shaft means, the locking arm having a lock tooth at its free end, and the bearing plate has teeth thereon arranged in a circle for lockingly engaging the lock tooth.

21. Sun roof according to claim 20 wherein the lever arm and the locking arm form a two-sided tilting lever, and which the lever arm can be pivoted toward the vehicle roof against a counterforce while the locking arm pivots away from the vehicle roof so that the teeth on the locking arm and the bearing plate engaged in the rest position disengage.

22. Sun roof according to claim 19 wherein the lever arm of the lever for driving the drive shaft means can be pushed lengthwise to a limited extent, and a lock element acting between the lever and the vehicle roof is arranged so that by the lengthwise movement of the lever the lock element is locked or unlocked in different rotational positions of the lever.

23. Sun roof according to claim 1 wherein the locking means includes a locking element having a U-shaped, especially cup-like form, the free end of the locking element defining a bent out rim for supporting the spring, and the inner surface of the bottom of the U-shaped cup-like locking element bearing against an end surface of the drive shaft in a locking position thereof.

* * * * *